Sept. 17, 1957 R. P. HENDERSON 2,806,960
QUARTZ FIBRE ELECTROSCOPES
Filed Dec. 14, 1951 2 Sheets-Sheet 2
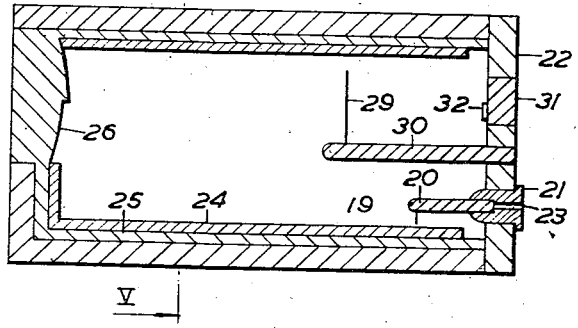
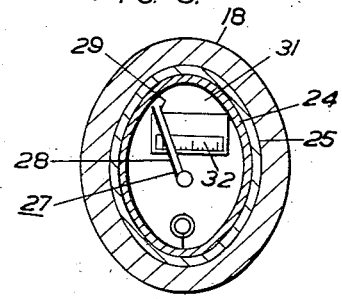
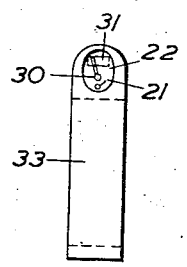 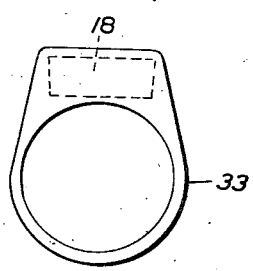
Inventor
RONALD PATERSON HENDERSON,
By Robert B. [signature]
Attorney

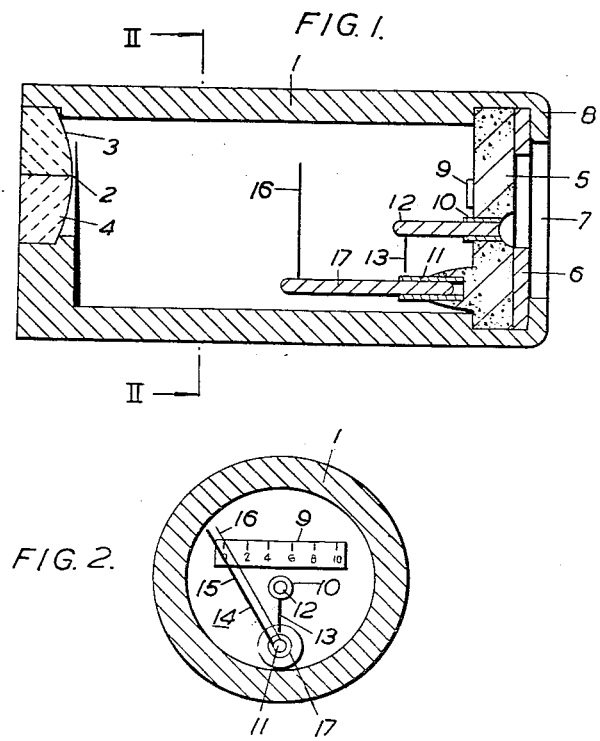

United States Patent Office 2,806,960
Patented Sept. 17, 1957

2,806,960

QUARTZ FIBRE ELECTROSCOPES

Ronald Paterson Henderson, Abingdon, Berkshire, England

Application December 14, 1951, Serial No. 261,663

5 Claims. (Cl. 250—83.3)

This invention relates to quartz fibre electroscopes.

Quartz fibre electroscopes have use as monitoring instruments for personnel engaged in localities where a radiation hazard exists and such electroscopes are usually designed to be suitable for carrying unobtrusively on the person. Known forms include one constructed in a body similar in form to a wrist watch case and another is constructed in a tube comparable in size and shape to that of a fountain pen.

A quartz fibre electroscope consists essentially of an airtight container inside which are mounted a quartz fibre system supported from a high grade insulator and a scale over which a flexible fibre of the fibre system moves. In the walls of the container there is provided a window to illuminate the scale and the flexible fibre and an optical system to provide enlarged images of the fibre and scale. The container may be made of metal or be provided with a metallic inner coating. The fibre system comprises a fine flexible quartz fibre of a few microns in thickness, which is supported in close proximity to another fibre or wire of greater thickness which is rigid. The fibres are metallised.

According to the invention a quartz fibre electroscope has a bifocal lens of focal lengths such that the moving fibre of a fibre system in the electroscope is viewed contiguous with the scale in the electroscope.

Also according to the invention a quartz fibre electroscope comprises a container, a window in the container of light-transmitting insulating material, a transparent scale on the window and a quartz fibre system on a support extending from the window, the fibre system having a metallised flexible fibre remote from but movable over the scale and a bifocal lens adapted for viewing the scale and fibre as contiguous images.

In one form of the invention a quartz fibre electroscope comprises a container of electrical conducting material, a sleeve of insulating material lining the walls of the container and a sleeve of conducting material lining the insulating sleeve, one end of the container supporting a window, a scale and a quartz fibre system in electrical contact with the end, and the opposite end having a bifocal lens adapted for viewing the fibre and scale as contiguous images and means for charging said sleeve of conducting material.

The use of a bifocal lens simplifies the optical system and allows for smaller construction of the electroscope. In the "fountain pen" type of electroscope a lens is provided to produce an image of the fibre on the scale and another lens, or eyepiece, is provided for viewing the scale and the image of the fibre. The length of such an electroscope is about twelve centimetres. An electroscope according to the invention using a bifocal lens has a length of about two centimetres.

A smaller size of construction of an electroscope generall results in smaller cost in production and allows the electroscope to be carried unobtrusively on the hands where it is in closer proximity to any articles handled.

Electroscopes embodying the invention are now described with reference to the drawings.

Fig. 1 is a longitudinal sectional elevation of one form.

Fig. 2 is a transverse section on the line II—II of Fig. 1.

Fig. 3 shows the presentation of the images of the scale and the flexible fibre.

Fig. 4 is a longitudinal sectional elevation of another form.

Fig. 5 is a transverse section on the line V—V of Fig. 4.

Fig. 6 is a side elevation of a finger ring holding an electroscope of the type shown in Figs. 4 and 5.

Fig. 7 is a front elevation of Fig. 6.

In Figs. 1 and 2 a tubular aluminium container 1 of about 8 mm. external diameter and 20 mm. long has provided at one end a bifocal lens 2 having lens elements 3, 4. At the other end of the container 1 there is a light-transmitting insulator 5 of polystyrene and a disc 6 having an aperture 7. The insulator and disc are secured by the spun ends 8 of the container 1. Moulded in the insulator there is a scale 9, a charging electrode support 10 and a fibre system support 11. The scale consists of etched figures on a glass plate. The supports 10, and 11 are constructed from copper tube. Crimped into the support 10 there is an aluminium wire 12 carrying a fine metallised quartz fibre 13 which extends in the direction of support 11 so that a corona discharge may be set up across the space between the fibre and support. A fibre system 14 consists of a rigid metallised fibre 15 and a flexible metallised fibre 16 carried in an aluminium wire 17 crimped into the support 11.

Light, to illuminate the scale 9 and fibre 16, enters the electroscope through the aperture 7 in the disc 6. The charging electrode support 10 and wire 12 are exposed at their ends in the aperture 7 for charging purposes. The fibre system is charged to a potential of about 100 volts relative to the container 1 by the application of a potential of about 1,000 volts to the support 10. The charging process is carried out until the flexible fibre 16 is observed to move over a full scale deflection.

In Fig. 3 the fibre image 16' viewed by the element 3 of lens 2 is shown as contiguous to the scale image 9' viewed by the element 4.

Figs. 4 and 5 show modifications over Figs. 1 and 2. The container 18 is oval in form to provide more accommodation along the direction of the major axis without substantially altering the cross-sectional area. Charging of the electroscope is effected by a corona charging fibre 19 supported on a wire 20 embedded in a polystrene insulator 21 in the end 22 of the container. A hole 23 is provided in the insulator 21 so that a metal probe may be inserted to apply a charging potential to the wire 20. The probe charges the metal sleeve 24 which is moulded in a polystyrene sheath 25. The moulded sheath 25 also includes the bifocal lens 26. The fibre system 27 is similar to system 14 of Figs. 1 and 2. It consists of a relatively rigid metallised fibre 28 and a flexible metallised fibre 29 carried in an aluminium wire 30 fixed in the end 22. A polystyrene window 31 is also moulded into the end 22 and the window carries a scale 32.

Figs. 6 and 7 show the electroscope of Figs. 5 and 6 fitted into a finger ring 33.

We claim:

1. A quartz fibre electroscope comprising a scale and a quartz fibre associated therewith movable in a plane parallel to and remote from the scale, and a bifocal lens having a focal length on one side of a diameter adapted to produce a magnified image of the scale and a focal length on the other side of said diameter adapted to produce a magnified image of the quartz fibre in the same plane and contiguous with the image of the scale.

2. A quartz fibre electroscope comprising a container, a window in the container of light-transmitting insulating material, a transparent scale on the window and a quartz fibre system on a support extending from the window, the fibre system having a metallised flexible fibre remote from but movable over the scale and a bifocal lens adapted for viewing the scale and fibre as contiguous images.

3. A quartz fibre electroscope comprising a container of electrical conducting material, a sleeve of insulating material lining the walls of the container and a sleeve of conducting material lining the insulating sleeve, one end of the container supporting a window, a scale and a quartz fibre system in electrical contact with the end, and the opposite end having a bifocal lens adapted for viewing the fibre and scale as contiguous images and means for charging said sleeve of conducting material.

4. A quartz fibre electroscope as claimed in claim 3 wherein said sleeve of insulating material is light transparent and the bifocal lens is moulded integral therewith.

5. A quartz fibre electroscope as claimed in claim 1 supported on a ring adapted to fit on the human finger.

References Cited in the file of this patent

UNITED STATES PATENTS

| 727,073   | Brayton        | May 5, 1903   |
| 1,563,483 | Grossmann      | Dec. 4, 1925  |
| 1,933,063 | Kolhorster     | Oct. 31, 1933 |
| 2,022,117 | Lauritsen      | Nov. 26, 1935 |
| 2,168,464 | Yeda           | Aug. 8, 1939  |
| 2,465,886 | Landsverk et al. | Mar. 29, 1949 |
| 2,577,253 | Lauristen      | Dec. 4, 1951  |
| 2,677,773 | Carmichael     | May 4, 1954   |

FOREIGN PATENTS

| 338,458 | Great Britain | Nov. 20, 1930 |

OTHER REFERENCES

Dosimeters and Pocket Chambers, Landsverk MDDC, 395 Oct. 28, 1946, published by Technical Information Branch, Oak Ridge, Tennessee, pp. 1–8.